United States Patent [19]

Maurer

[11] Patent Number: 5,744,726
[45] Date of Patent: Apr. 28, 1998

[54] PRESSURE SENSOR WITH REDUCED DEAD SPACE ACHIEVED THROUGH AN INSERT MEMBER WITH A SURFACE GROOVE

[75] Inventor: D. Joseph Maurer, Pearl City, Ill.

[73] Assignee: Honeywell Inc., Minneapolis, Minn.

[21] Appl. No.: 805,480

[22] Filed: Feb. 25, 1997

[51] Int. Cl.$^6$ ................... G01L 9/06; G01L 9/00
[52] U.S. Cl. ................ 73/727; 73/756; 73/726; 73/724
[58] Field of Search ............... 73/756, 727, 726, 73/724, 728, 725, 723, 152.51, 152.52, 152.53, 720, 718, 721

[56] References Cited

U.S. PATENT DOCUMENTS

| | | |
|---|---|---|
| 4,970,898 | 11/1990 | Walish et al. ............... 73/756 X |
| 5,184,107 | 2/1993 | Maurer. |
| 5,187,985 | 2/1993 | Nelson. |
| 5,327,785 | 7/1994 | Maurer. |
| 5,410,916 | 5/1995 | Cook. |
| 5,509,312 | 4/1996 | Donzier et al. ............... 73/155 X |

*Primary Examiner*—George M. Dombroske
*Assistant Examiner*—Joseph L. Felber
*Attorney, Agent, or Firm*—William D. Lanyi; Roland W. Norris

[57] ABSTRACT

A pressure sensor is provided with an insert member that reduces the dead space of a fluid conduit used to provide fluid communication between a pressure sensitive component and a cavity within which a volume is contained. The insert member is provided with a channel formed in its outer surface so that continued fluid communication can be maintained between the fluid whose pressure is to be monitored and a pressure sensitive component disposed within the structure of the pressure sensor. The use of the insert member significantly facilitates the manufacture of the pressure sensor and reduces the need to utilize pins of excessively small cross sectional area during the molding process.

14 Claims, 3 Drawing Sheets

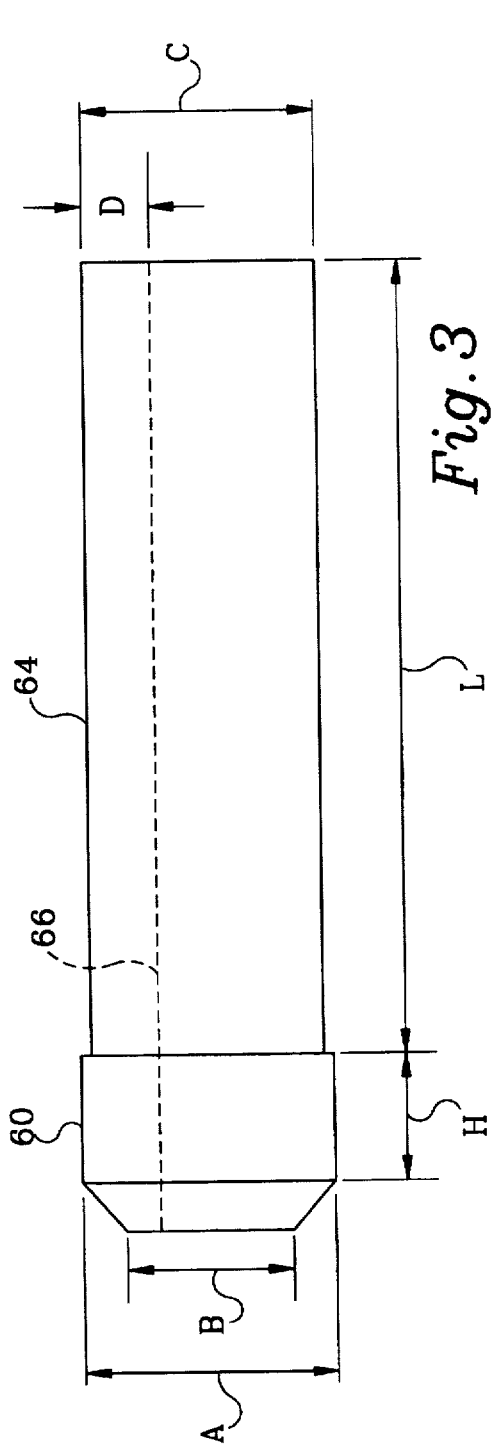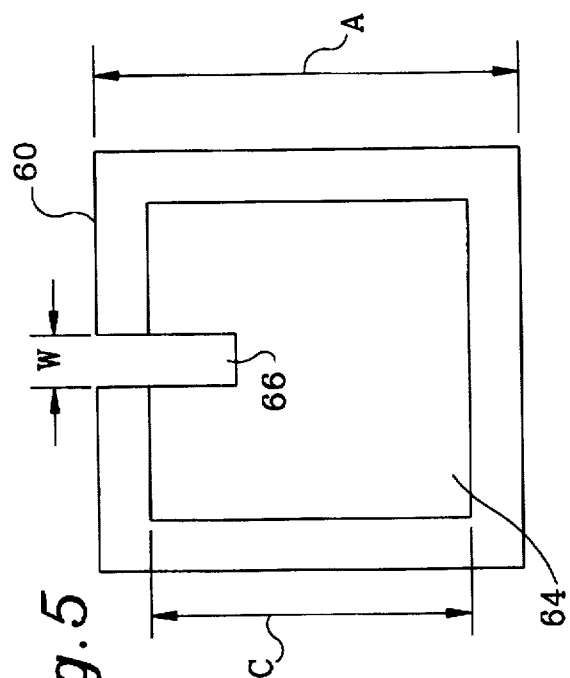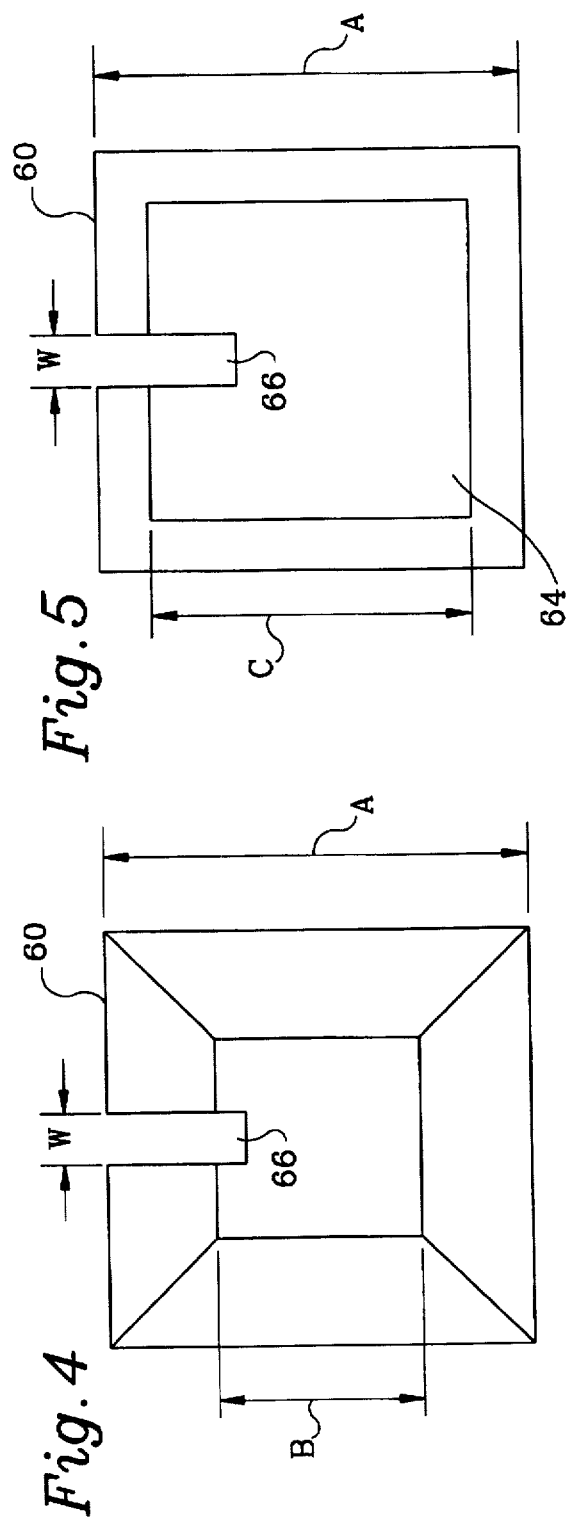

PRESSURE SENSOR WITH REDUCED DEAD SPACE ACHIEVED THROUGH AN INSERT MEMBER WITH A SURFACE GROOVE

BACKGROUND OF THE INVENTION

1. Field of the Invention

The present invention is generally related to pressure sensors and, more particularly, to a pressure sensor that provides an insert within its fluid conduit for the purpose of reducing the dead space within the sensor and, as a result, improves the sensitivity of the sensor.

2. Description of the Prior Art

Many different types of pressure sensors are well known to those skilled in the art. One particular type of pressure sensor incorporates a pressure sensitive component that comprises a silicon die. The silicon die is provided with one or more piezoresistors which provide an output signal in response to a deflection of a portion of the silicon die in response to a pressure exerted against a portion of the die. Some silicon pressure transducers incorporate a die which is etched to produce a recess that defines a thinned region referred to as a diaphragm. Some pressure sensors are applied to relatively static fluids while others are associated with fluid channels through which a fluid flows.

U.S. Pat. No. 5,184,107, which issued to Maurer on Feb. 2, 1993, discloses a piezoresistive pressure transducer with a conductive elastomeric seal. The low cost pressure transducer utilizes premolded elastomeric seals in which at least one seal is electrically conductive. A piezoresistive stress sensitive element, in the form of a diaphragm of semiconductor material having a thickened rim, is held at its rim between a pair of premolded elastomeric seals in a two piece housing. Electrical connections with external circuitry are made by conductive paths through one of the elastomeric seals which makes contact with electrical leads which pass through the housing wall.

U.S. Pat. No. 5,187,985, which issued to Nelson on Feb. 23, 1993, describes an amplified pressure transducer. The pressure transducer circuit has a bridge arrangement piezoresistors which are connected to a diaphragm that is sensitive to a pressure which is being monitored. The output of the sensor bridge is provided to a preamplifier which is, in turn, associated with an attenuation network and compensation circuitry. The transducer incorporates a plurality of temperature sensitive resistors within the compensation circuit and these temperature sensitive resistors are produced at the same time and during the same manufacturing step as the piezoresistors of the bridge arrangement. In addition, they are produced using the same dopant and are implanted or diffused in the same semiconductor layer as the piezoresistors. The pressure transducer circuit incorporates a plurality of trimmable resistors which are adjusted during a calibration stage to compensate for temperature variations and nonlinearity of the various components in the circuit. The amplified pressure transducer eliminates the necessity for the use of thermistors to provide this compensation.

U.S. Pat. No. 5,327,785, which issued to Maurer on Jul. 12, 1994, discloses a pressure sensor with improved heat dissipation characteristics. The pressure sensor is provided with the means for efficiently removing heat from a circuit portion of a sensor die by providing an elastomeric member between a first surface of the sensor die and the electrical leads. A thermally conductive, but electrically insulative, portion of the elastomeric member is disposed between the circuit portion of the sensor die and the leads and a means is provided for urging the first surface of the sensor die into thermal communicating contact with the thermally conductive portion of the elastomeric member. In addition, a selectively conductive portion of the elastomeric member is disposed between contact pads on the first surface of the sensor die and electrical leads encapsulated within a portion of the sensor housing. The elastomeric member is also provided with an opening formed therethrough and aligned with the diaphragm portion of the sensor die to permit the media to be in fluid communication with the diaphragm of the sensor die. The improved sensor die arrangement provided by the present invention can be adapted for use in either an absolute pressure sensing embodiment or a differential pressure sensing embodiment.

U.S. Pat. No. 5,410,916, which issued to Cook on May 2, 1995, describes a flowthrough pressure sensor. The flowthrough pressure sensor avoids the creation of crevices and creases that could possibly provide regions which are difficult to clean. The pressure sensor is particularly adapted for use in applications that require cleansing to avoid the buildup of bacterial-laden material. The flowthrough pressure sensor is particular adapted for use in the measurement of bodily fluids. A first conduit is connected in fluid communication with the second conduit which, in turn, is associated with a pressure sensitive element and two compressible seals. A housing member is provided with an opening into which the compressible seals and the pressure sensor element are disposed. A latching mechanism is provided to force the housing against a boss portion of the first conduit so that the seals and the pressure sensitive element are compressed therebetween.

The patents described immediately above are hereby expressly incorporated by reference in the following description of the present invention.

Most pressure sensor configurations require some type of conduit so that the pressure sensitive component of the sensor can be disposed in fluid communication with a fluid whose pressure is to be sensed. Most typically, the fluid is disposed within a confinement of some type and the pressure sensor is attached to it in such a way that the pressure sensing component within the pressure sensor can experience the same pressure as the fluid. This requires some type of opening or conduit which connects the pressure sensitive component in fluid communication with the fluid whose pressure is to be monitored. The requirement that the pressure sensor has this conduit for these purposes creates a potentially undesirable characteristic in the pressure sensor for certain applications.

In pressure measuring applications where responsiveness is a critically required characteristic, the volume of fluid within the connecting conduit can adversely affect the responsiveness of the sensor. The volume within this connecting conduit is sometimes referred to as "dead space" by those skilled in the art. The problem is particularly troublesome when the fluid is compressible. Naturally, this problem is aggravated with an increased volume of dead space. It is therefore beneficial to reduce the dead space as much as possible in sensors that are used in applications where responsiveness is critical.

Another problem that relates to the responsiveness issue described immediately above is the fact that plastic molded parts are not easily manufactured with long openings which have very small cross sectional areas. These types of openings are typically molded by providing a long thin pin in the mold cavity around which the plastic is injected. When the pin is then removed from the finished part, the volume formerly occupied by the pin remains as a conduit in the molded plastic part. The necessity to have a pin with dimensions greater than certain minimum values for the purpose of permitting the molding operation to be practical are not always compatible with the desire to minimize the size of the resulting conduit formed by the pin during the molding operation. It would therefore be significantly beneficial to the art of pressure sensor design and manufacture if the dead space within the conduit could be significantly reduced without exacerbating the difficulty of manufacturing the product by necessitating the use of molding pins with excessively small cross sectional dimensions. It would therefore also be beneficial if a means could be provided which utilizes standard molding techniques while also minimizing the volume of the dead space within the pressure sensor structure.

SUMMARY OF THE INVENTION

The present invention provides a pressure sensor that comprises a housing structure having a first cavity formed therein. A pressure sensitive component is disposed within the first cavity.

A second cavity contains a fluid whose pressure is to be measured. The pressure sensor of the present invention provides a first conduit formed within the housing structure. The first conduit connects the second cavity in fluid communication with the pressure sensitive component. An insert member is provided for the present invention and is disposed within the first conduit. A channel is formed within the insert member to connect the pressure sensitive component in fluid communication with the second cavity.

In a particularly preferred embodiment of the present invention, the pressure sensitive component comprises an etched recess which defines a diaphragm region of the pressure sensor die. The pressure sensitive component can be made of silicon and a plurality of piezoresistors can be disposed on the diaphragm.

In certain applications of the present invention, the second cavity comprises a second conduit through which fluid is directed to flow. This type of application is generally called a flowthrough pressure sensor application.

The pressure sensitive component can be disposed between a first compressible seal and a second compressible seal. The first and second compressible seals are disposed within the first cavity of the pressure sensor housing. In certain preferred embodiments of the present invention, one of the two compressible seals is electrically conductive in a preselected direction through the thickness of the seal. This type of elastomeric conductor is available in commercial quantities and is generally well known to those skilled in the art.

The insert member of the present invention comprises a shank portion and a head portion in a particularly preferred embodiment of the present invention although the head portion is not always necessary. The channel extends along the length of the head portion and the shank portion. The channel can be formed in a surface of the insert member. The formation of the channel in the surface of the insert member facilitates the ease of manufacture during the injection molding process because the channel can be formed by the presence of a blade attached to the surface of the mold cavity. This procedure is much easier to perform than alternative methods when the channel is less than certain minimal dimensions. If, on the other hand, a pin is used for these purposes and the length of the pin extends away from a wall of the mold cavity, certain minimum cross sectional dimensions of the pin must be maintained. This requirement is not present when the blade is attached to the wall of the cavity and its width extends from the wall and not its length. In this type of application, in order to form a channel in the surface of the insert member, only the width of the blade extends away from the inner wall of the mold cavity. This arrangement significantly improves the manufacturability of the insert member.

BRIEF DESCRIPTION OF THE DRAWINGS

The present invention will be more fully and completely understood from a reading of the Description of the Preferred Embodiment in conjunction with the drawings, in which:

FIGS. 3, 4 and 5 show various views of an insert member which can be used in conjunction with the present invention;

DESCRIPTION OF THE PREFERRED EMBODIMENT

Figure 2:
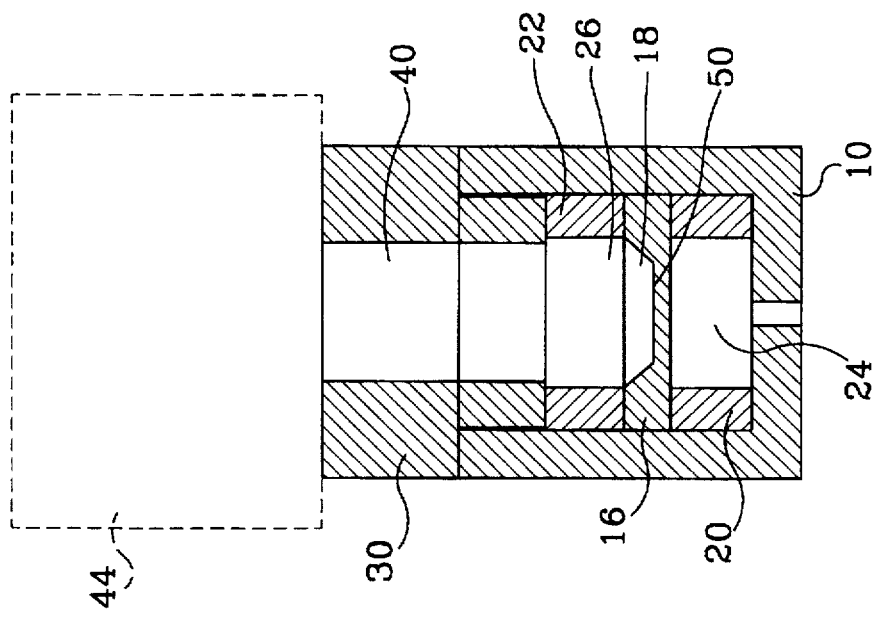
FIGS. 1 and 2 show pressure transducers that are generally known to those skilled in the art.

Throughout the Description of the Preferred Embodiment, like components will be identified by like reference numerals.

Figure 1:
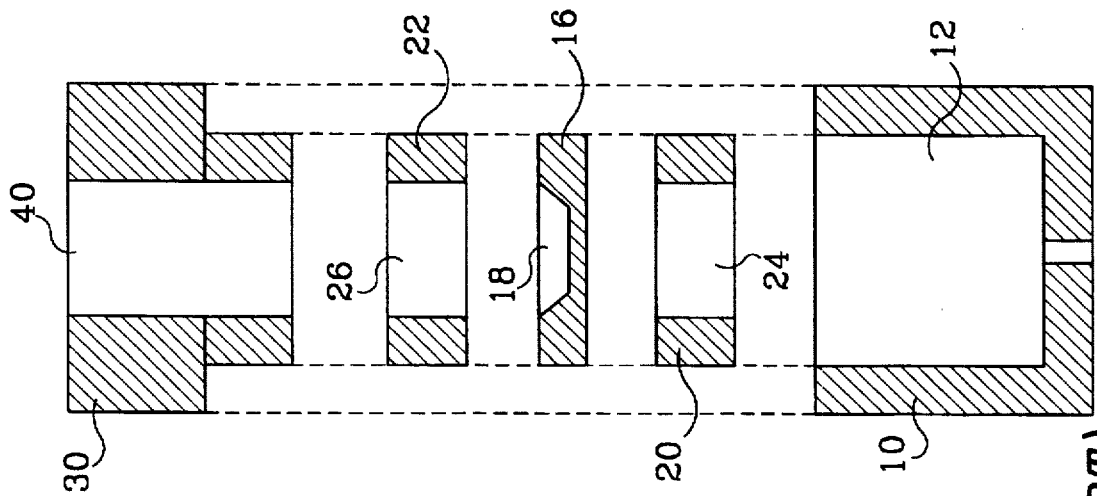

FIG. 1 is an exploded view of a pressure sensor of the basic type generally known to those skilled in the art. The pressure sensor comprises a housing structure 10 which has a first cavity 12 formed therein. A pressure sensitive component 16 is disposed within the first cavity 12. The pressure sensitive component 16 can have a recess 18 formed in it to define a diaphragm portion.

With continued reference to FIG. 1, the pressure sensitive component 16 is disposed between a first compressible seal 20 and a second compressible seal 22. These two seals each have an opening extending therethrough. Reference numeral 24 identifies the opening extending the thickness of the first compressible seal 20 and reference numeral 26 identifies the opening extending through the thickness of the second compressible seal 22. These first and second compressible seals are disposed within the first cavity 12. A top portion 30 of the housing structure is disposed on the first and second seals and pressure sensitive component after they are disposed within the first cavity 12. The top portion 30 is shaped to provide a compressive force on these members. Although not shown in FIG. 1, a means for attaching the top portion 30 to the housing structure 10 is provided. This is typically accomplished by providing snaps and bails as is well known to those skilled in the art and as is described in the cited patents described above. The exploded view in FIG. 1 shows a typical structure that is generally well known to those skilled in the art.

FIG. 2 shows the structure of FIG. 1 after it is assembled together. The housing structure 10 is shown with the compressible seal 20, the pressure sensitive component 16 and the second compressible seal 22 disposed within its cavity. The top portion 30 is attached to the housing structure 10 to compress the three members together within the first cavity 12 of the housing structure 10. A first conduit 40 extends through the housing of the pressure sensor and connects the recess 18 in fluid communication with a second cavity 44 which contains a fluid whose pressure is to be monitored. The second cavity 44 is represented by dashed lines in FIG. 2. The shape of the second cavity 44 will depend on the application in which the pressure sensor is used. Certain applications, referred to as flowthrough sensors, would provide a second conduit in place of the shape represented in FIG. 2 for the second cavity 44. The purpose of the first conduit 40 is to connect the second cavity 44 in fluid communication with the first cavity 12 and, more specifically, to connect the second cavity 44 in fluid communication with the pressure sensitive component 16. In FIG. 2, the diaphragm portion 50 of the pressure sensitive component 16 is defined by the recess 18 that is formed partially through the thickness of the silicon die. The recess 18 is formed by etching one surface of the die in a manner which is well known to those skilled in the art.

With continued reference to FIG. 2, the volume of space within the first conduit 40 and opening 26 is sometimes referred to as dead space. Its primary function is to provide fluid communication between the second cavity 44 and the diaphragm 50 of the pressure sensitive component. In certain applications, the volume of this dead space can be seriously detrimental to the proper operation of the pressure sensor. When changes of pressure occur in the second cavity 44, the possible compressibility of gas bubbles with the fluid within the first conduit 40 can result in a decreased response of the pressure sensor. It is therefore beneficial if the volume of first conduit 40 is made as small as possible. The volume of the first conduit 40 is generally determined by its length and cross sectional area. In certain pressure sensors, the first conduit 40 has a generally square cross section and its length, in the vertical direction in FIG. 2, is determined by the necessary thickness of the top portion 30 and the extension of the top portion which extends downward into the first cavity 12. Other requirements of the pressure sensor can also affect the volume of the dead space within the first conduit 40.

In order to alleviate the problem described above in conjunction with the first conduit 40 and the dead space that it creates, the present invention provides an insert member which minimizes the magnitude of the dead space.

FIG. 3 shows the insert member, which can have a head portion 60 and a shank portion 64. FIG. 3 shows a side view of the insert member. A channel 66 is formed in an outer longitudinal surface of the insert member and extends through both the head portion 60 and shank portion 64. In FIGS. 3, 4 and 5, various dimensions are identified by reference letters. Although the specific dimensions of the insert member are not limiting to its application or to the scope of the present invention, a typical set of these dimensions is provided in Table I below in order to illustrate the extremely small sizes of the components and to further emphasize the types of problems that are solved by the present invention.

TABLE I

| Reference Letter | Physical Dimension |
| --- | --- |
| A | 0.060 inches |
| B | 0.040 inches |
| C | 0.050 inches |
| D | 0.010 inches |
| H | 0.030 inches |
| L | 0.115 inches |
| W | 0.010 inches |

FIG. 4 shows an end view of the insert member. As can be seen, the cross sectional area of the head portion 60 is generally square and is formed in the general shape of a frustum of a pyramid. The channel 66 is generally rectangular in shape and extends completely through the head portion along its length H, as illustrated in FIG. 3.

FIG. 5 is an end view of the insert member showing the generally square cross section of the shank portion 64 and head portion 60. The channel 66 extends through the length of the insert member and intersects an outer surface of both the shank portion 64 and head portion 60.

With reference to FIGS. 4 and 5, the depth of channel 66 into the head portion 60 is greater than the depth of channel 66 into the shank portion 64. This results from the difference in magnitude of dimensions A and C and the common bottom of the channel 66 throughout the entire length of the insert member.

Figure 6:
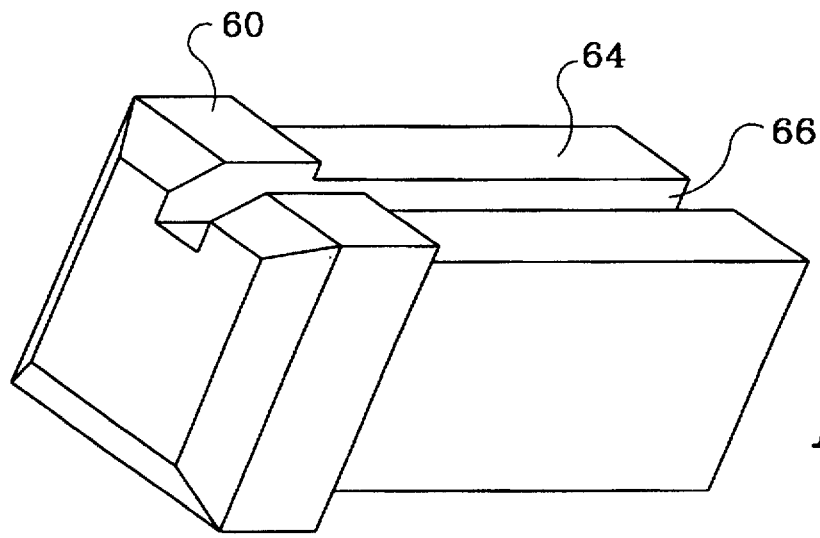
FIG. 6 is a perspective view of the insert member described above in conjunction with FIGS. 3, 4 and 5.

FIG. 6 shows a perspective view of the insert member. The head portion 60 and the shank portion 64 have the channel 66 formed therein at one surface of the insert member. The function of the insert member is to reduce the volume of the dead space within the first conduit 40 of the pressure sensor and the function of the channel 66 is to provide fluid communication between the second cavity 44 and the pressure sensitive component 16. Normally this fluid communication would be provided by the first conduit 40, but its larger size would detrimentally increase the volume of the dead space. By providing the insert member, a much smaller channel 66 can be provided to perform this fluid communicating function without deleteriously increasing the magnitude of the dead space in the first conduit 40. By providing the insert member, the channel 66 can be formed in a surface of the insert member much more easily than an attempted reduction in the size of the original first conduit 40 could be accomplished. As described above, the formation of a first conduit 40 which is small enough to accomplish the intent of the present invention would require certain injection molding techniques that could not be satisfactorily accomplished at a reasonable expense. The reduction in size of the first conduit 40, during its injection molding process, would require a long pin of exceptionally small cross sectional area to be attached to the wall of a molding cavity with its length extending unsupported into the cavity. By providing the insert member, the channel 66 can be made of a very small size by more easily attaching a thin blade to the wall of the molding cavity. Only the width of the blade needs to extend into the cavity of the mold. This allows a much smaller channel 66 to be formed.

Figure 7:
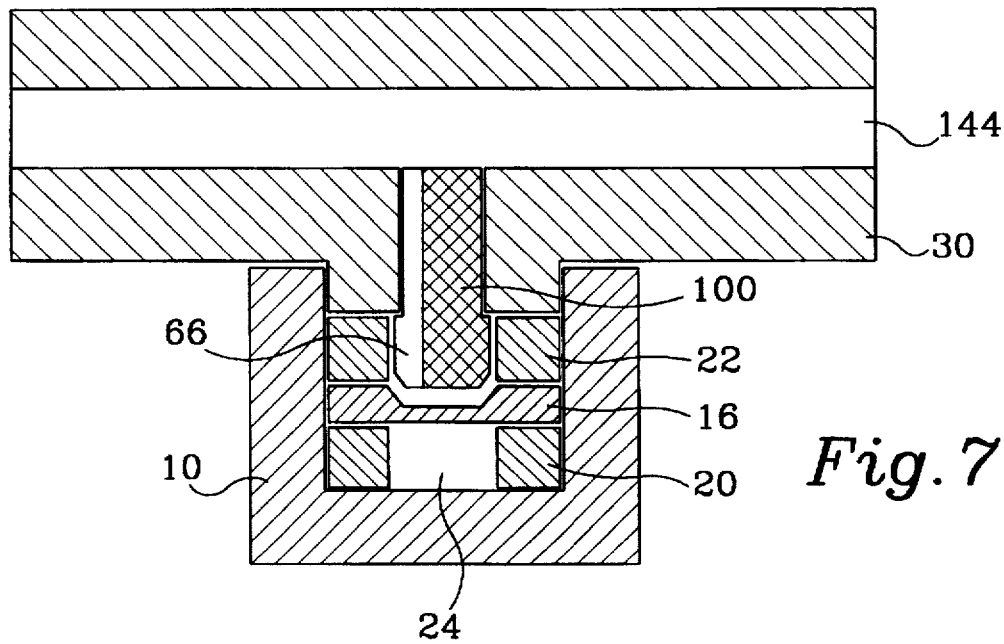
FIG. 7 is a cross sectional view of an insert member disposed within a pressure sensor conduit.

When the insert member 100 is disposed within the first conduit 40, the result is a significantly reduced dead space. This is illustrated in FIG. 7. The pressure sensor in FIG. 7 is a flowthrough pressure sensor which has a second cavity 144 that is shaped to perform the function of a second conduit through which a fluid can flow. The function of the pressure sensor is to measure the pressure of the fluid that flows through the second conduit 144. Comparing FIGS. 2 and 7, the second conduit 144 is analogous to the second cavity 44 in FIG. 2. The channel 66 formed in the insert member 100 allows fluid communication to exist between the fluid within the second cavity 144 and the pressure sensitive component 16. However, it significantly reduces the dead space within this first conduit 40.

Figure 8:
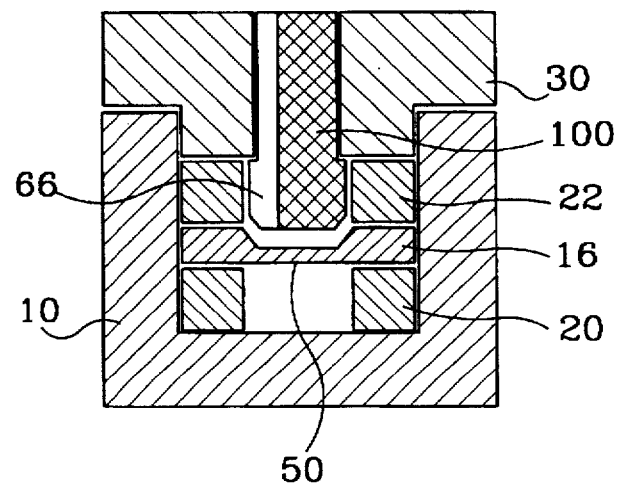
FIG. 8 is an alternative embodiment of the pressure sensor shown in FIG. 7.

FIG. 8 shows an alternative embodiment of the present invention in which it is disposed in a pressure sensor that is shaped to be applied directly to an orifice. This modular structure comprises a top portion 30 which attaches to a housing structure 10 in the manner described above in conjunction with FIGS. 1 and 2. The insert member 100 is disposed within the first conduit 40 and is provided with a channel 66 formed in its outer surface. The device shown in FIG. 8 is typically attached, by the user of the pressure sensor, to a manifold structure with the upper opening of the first conduit 40 disposed proximate to an opening in the manifold. The particular type of connection used to perform this function is not directly related to the present invention and will not be described in detail herein.

The basic function of the present invention is to provide an insert member 100 that significantly reduces the dead space within the opening of the first conduit 40, but allows fluid communication to exist between a pressure sensitive component 16 and a second cavity 44 which can be a second conduit 144 as shown in FIG. 7 or a container of static fluid as represented by the dashed lines in FIG. 2.

Although the present invention has been described with particular specificity and illustrated to show a preferred embodiment of the present invention, it should be understood that alternative embodiments are also within its scope.

The embodiments of the invention in which an exclusive property or right is claimed are defined as follows:

1. A pressure sensor, comprising:

a housing structure having a first cavity formed therein;

a pressure sensitive component disposed within said first cavity;

a second cavity containing a fluid;

a first conduit formed within said housing structure, said first conduit connecting said second cavity in fluid communication with said pressure sensitive component;

an insert member disposed within said first conduit; and a channel formed within a longitudinal outer surface of said insert member, said channel being formed to connect said pressure sensitive component in fluid communication with said second cavity.

2. The pressure sensor of claim 1, wherein:

said pressure sensitive component comprises an etched recess which defines a diaphragm.

3. The pressure sensor of claim 1, wherein:

said pressure sensitive component is made of silicon.

4. The pressure sensor of claim 1, wherein:

said second cavity comprises a second conduit through which said fluid is directed to flow.

5. The pressure sensor of claim 1, wherein:

said pressure sensitive component is disposed between a first compressible seal and a second compressible seal, said first and second compressible seals are disposed within said first cavity.

6. The pressure sensor of claim 1, wherein:

said insert member comprises a shank portion and a head portion having lesser and greater outside dimensions, respectively, said channel extending along the length of said head portion and said shank portion.

7. A pressure sensor, comprising:

a housing structure having a first cavity formed therein;

a pressure sensitive component disposed within said first cavity, said pressure sensitive component being made of silicon;

a second cavity containing a fluid;

a first conduit formed within said housing structure, said first conduit connecting said second cavity in fluid communication with said pressure sensitive component;

an insert member disposed within said first conduit; and a channel formed within a longitudinal surface and as an open groove of said insert member, said channel being formed to connect said pressure sensitive component in fluid communication with said second cavity.

8. The pressure sensor of claim 7, wherein:

said pressure sensitive component comprises an etched recess which defines a diaphragm.

9. The pressure sensor of claim 7, wherein:

said second cavity comprises a second conduit through which said fluid is directed to flow.

10. The pressure sensor of claim 7, wherein:

said pressure sensitive component is disposed between a first compressible seal and a second compressible seal, said first and second compressible seals are disposed within said first cavity.

11. The pressure sensor of claim 7, wherein:

said insert member comprises a shank portion and a head portion, said channel extending along the length of said head portion and said shank portion.

12. A pressure sensor, comprising:

a housing structure having a first cavity formed therein;

a pressure sensitive component disposed within said first cavity, said pressure sensitive component being made of silicon, said pressure sensitive component comprising an etched recess which defines a diaphragm;

a second cavity containing a fluid;

a first conduit formed within said housing structure, said first conduit connecting said second cavity in fluid communication with said pressure sensitive component;

an insert member disposed within said first conduit; and a channel formed on a longitudinal outer surface of said insert member, said channel being formed to connect said pressure sensitive component in fluid communication with said second cavity, said second cavity comprising a second conduit through which said fluid is directed to flow.

13. The pressure sensor of claim 12, wherein:

said pressure sensitive component is disposed between a first compressible seal and a second compressible seal, said first and second compressible seals are disposed within said first cavity.

14. The pressure sensor of claim 12, wherein:

said insert member comprises a shank portion and a head portion, having lesser and greater outside dimensions, respectively, said channel extending along the length of said head portion and said shank portion.

\* \* \* \* \*